US007025799B2

(12) United States Patent
Peterson

(10) Patent No.: US 7,025,799 B2
(45) Date of Patent: Apr. 11, 2006

(54) CARBURETOR AIR FLOW STRUCTURE

(76) Inventor: Lonn M. Peterson, 21676 Deep Lake Rd., Richmond, MN (US) 56368

( * ) Notice: Subject to any disclaimer, the term of this patent is extended or adjusted under 35 U.S.C. 154(b) by 245 days.

(21) Appl. No.: 10/423,798

(22) Filed: Apr. 25, 2003

(65) Prior Publication Data

US 2004/0212104 A1 Oct. 28, 2004

(51) Int. Cl.
*B01D 29/90* (2006.01)

(52) U.S. Cl. .................. 55/385.3; 55/418; 55/DIG. 28; 123/198 E

(58) Field of Classification Search ............... 55/385.3, 55/418, DIG. 28; 261/64.1; 123/198 E
See application file for complete search history.

(56) References Cited

U.S. PATENT DOCUMENTS

| | | | | | |
|---|---|---|---|---|---|
| 1,812,860 | A | * | 7/1931 | Burns | 123/572 |
| 2,571,828 | A | * | 10/1951 | Brezek | 123/556 |
| 3,194,224 | A | * | 7/1965 | Lechtenberg et al. | 261/34.1 |
| 3,231,249 | A | * | 1/1966 | Kalert, Jr. | 261/41.5 |
| 3,678,912 | A | * | 7/1972 | Hensler | 123/518 |
| 3,796,027 | A | | 3/1974 | Gumtow | 55/502 |
| 3,852,377 | A | * | 12/1974 | Heintzelman et al. | 261/1 |
| 3,856,490 | A | * | 12/1974 | Heintzelman | 55/420 |
| 3,927,656 | A | * | 12/1975 | Reed et al. | 123/198 D |
| 4,083,184 | A | * | 4/1978 | Ushijima et al. | 60/293 |
| 4,135,897 | A | * | 1/1979 | Gondek | 55/404 |
| 4,326,862 | A | * | 4/1982 | Suzuki | 96/18 |
| 4,802,902 | A | * | 2/1989 | Bauerle et al. | 55/484 |
| 4,834,784 | A | * | 5/1989 | Bidanset | 55/385.7 |
| 4,888,034 | A | * | 12/1989 | Koga | 96/367 |
| 5,863,470 | A | | 1/1999 | Grant | 261/23.2 |
| 6,659,432 | B1 | * | 12/2003 | Nickel | 261/64.1 |
| 2001/0026024 | A1 | * | 10/2001 | Kahlhamer | 261/64.1 |

* cited by examiner

*Primary Examiner*—Richard L. Chiesa
(74) *Attorney, Agent, or Firm*—David George Johnson

(57) ABSTRACT

Air flow from the airbox (57) to the carburetor of an internal combustion engine is regulated by a plurality of valve bodies (66) fitted with rotatable lids (77) which permit infinite adjustment of air flow between a fully closed and fully open position. In an alternate embodiment, a rectangular valve is used that has a relatively lower profile and uses a sliding door (94) to permit manual adjustment of airflow to the airbox (57).

7 Claims, 5 Drawing Sheets

CARBURETOR AIR FLOW STRUCTURE

FIELD OF THE INVENTION

This invention relates generally to the field of carburetion within an internal combustion engine, and more particularly to regulation of air intake through the throat of a carburetor.

DESCRIPTION OF RELATED TECHNOLOGY

A typical internal combustion engine includes a carburetor within which fuel and air are mixed in order to provide the correct fuel/air ratio needed to support combustion in the engine cylinders. The carburetor structure typically includes a throat that is shaped to function as a venturi, which has the effect of increasing velocity of air passing through the carburetor throat. Depending on the geometry of the various carburetor components such as the throttle, jets and throat, the venturi effect can either promote or retard fuel/air mixing and fuel atomization, which ultimately affects the quality of combustion within the engine.

Since one effect of the venturi is to increase the velocity of air flow through the carburetor throat, the fluid flow Reynold's number (an indication of flow turbulence) may actually decrease as the air flow becomes more laminar or layered, thereby discouraging mixing of fuel throughout the available volume of air. Further, a lack of turbulence discourages the amount of fuel atomization which is essential to complete combustion, fuel economy and reduction of pollutants in the engine exhaust. On the other hand, high air flow velocities in a turbulent environment promote the mixing and atomization of fuel droplets within the carburetor.

Many solutions have been offered in order to solve the problem of proper fuel/air mixing within the carburetor throat. In general, efforts to atomize the fuel more thoroughly tend to diminish air velocity, thereby diminishing the production of power by the engine since, while well mixed, the overall volume and mass of fuel and air available to the engine has been reduced. An example of such a device is disclosed in U.S. Pat. No. 5,863,470, entitled CARBURETOR WITH REPLACEABLE VENTURI SLEEVES, issued to Grant on Jan. 26, 1999. The Grant venturi sleeves, which actually define the characteristics of the venturi itself, can have various shapes to promote a desired carburetor characteristic.

Upstream from the carburetor is the airbox which serves as the transition between the outside atmospheric air and the carburetor itself The airbox is typically designed to address concerns of moisture and particulate matter reaching the carburetor. Hence, the airbox is designed primarily as a filter having a large enough surface area to supply sufficient air mass to the carburetor during periods of peak demand. The volume of a typical airbox is approximately twenty times the displacement of the engine. An example of such an airbox is disclosed in U.S. Pat. No. 3,796,027, entitled FASTENING FOR SMALL ENGINE CARBURETOR AIR CLEANER, issued to Gumtow on Mar. 12, 1974.

Since the airbox is designed as an air filter its airflow characteristics are necessarily somewhat restrictive, arguably resulting in reduced engine performance. In an effort to address this problem attempts have been made to improve airflow by removing baffles or drilling holes through the side of the airbox, or to remove substantial portions of the airbox structure. In extreme cases the airbox is completely removed and replaced with a filter pod or bulb, thereby exposing substantially the entire surface area of the filter to the atmosphere. Other researches feel that a completely "open" (nothing between the atmosphere and the carburetor throat) improves performance, although admittedly at the cost of engine life due to the introduction of contaminants.

Modem engines with well designed air boxes typically produce stable engine power over a broad operating range. Unfortunately, for a given internal combustion engine operating in a given environment, there will be some optimum air box airflow characteristic which cannot be satisfied by a fixed air box geometry, due to the phenomenon of air box resonance. The forward velocity of a vehicle traveling at under 100 miles per hour increases the air pressure within the air box, and hence any ram air effect, by less than one percent. However, air box geometry inherently creates standing waves of air pressure that exist at some discrete fundamental frequency and usually at some harmonics of that frequency. If the high pressure amplitude peak of the standing waves within the air box coincides with the intake stroke of an engine cylinder, the volume of air entering the cylinder during the fixed duration of the intake stroke is increased, thereby providing an increase in engine power. A properly tuned air box can produce torque gains of fifteen percent within selected speed ranges. However, the variations in engine characteristics, the individual characteristics of the vehicle to which the engine is attached, altitude above sea level, relative humidity, air filter cleanliness and the speed range at which a vehicle user may wish to operate most frequently are not identical, thereby causing a fixed geometry air box to offer compromised performance in most real world applications.

SUMMARY OF THE INVENTION

The present invention includes a variable geometry air box which includes one or more air flow control valves within the air box. The valves may be opened to intermediate settings between fully opened and fully closed, thereby permitting the user to tune the air box in order to obtain desired engine performance.

DETAILED DESCRIPTION OF THE PRESENT INVENTION

Figure 1:
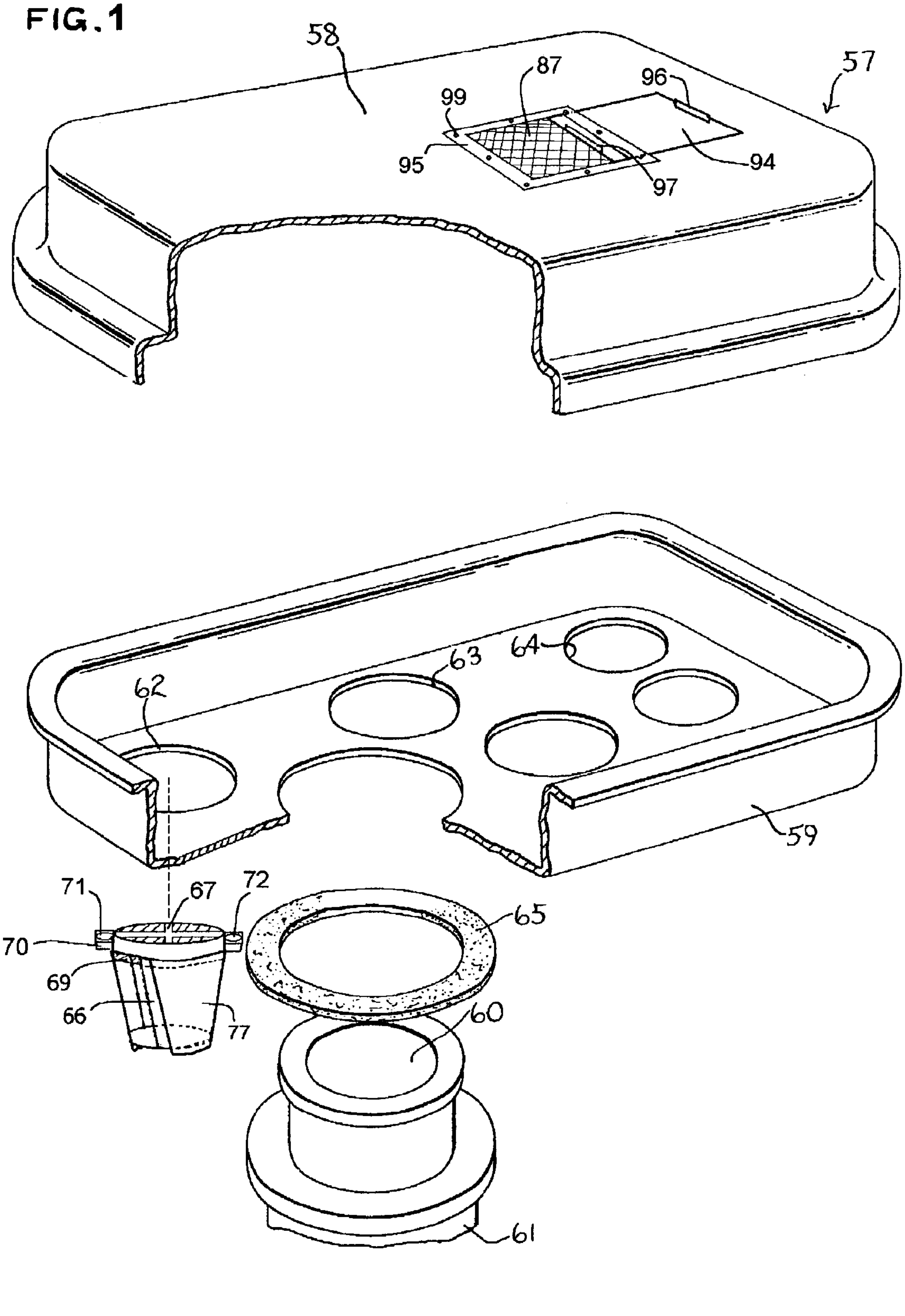
FIG. 1 is an exploded view of an air box employing the present invention.
Figure 2:
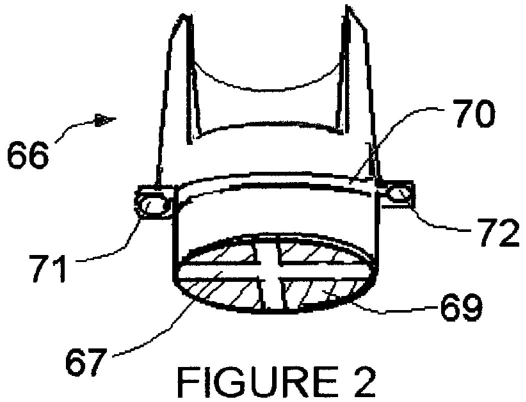
FIG. 2 is a perspective view of an adjustable air valve body constructed in accordance with the principles of the present invention.
Figure 3:
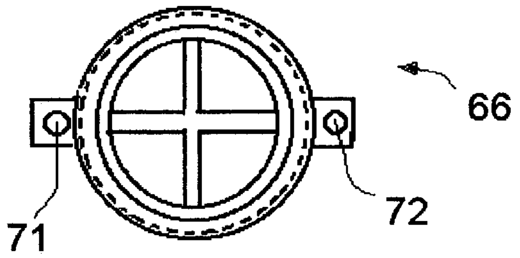
FIG. 3 is a bottom plan view of the valve body depicted in FIG. 2.
Figure 4:
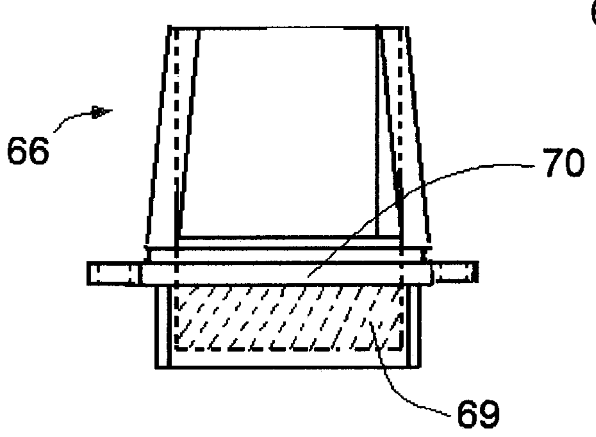
FIG. 4 is front elevation of the valve body depicted in FIG. 2.
Figure 5:
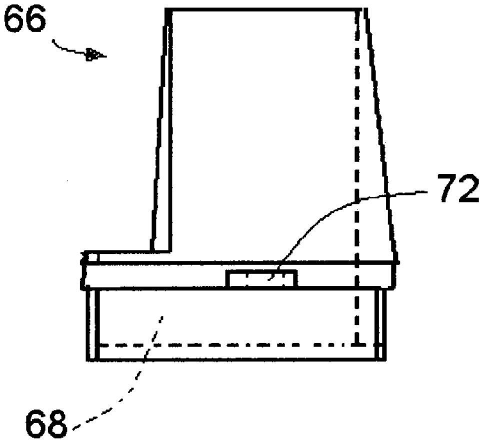
FIG. 5 is a side elevation of the valve body depicted in FIG. 2.
Figure 6:
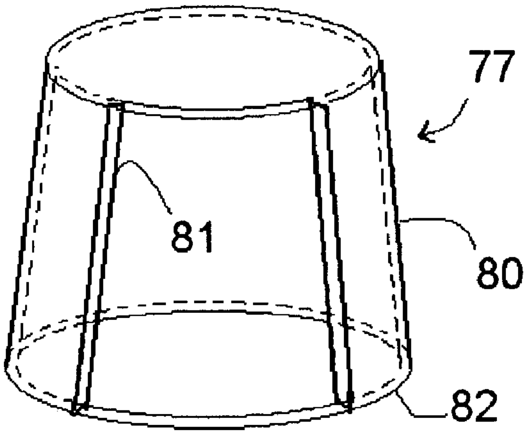
FIG. 6 is a perspective view of an adjustable air valve lid constructed in accordance with the principles of the present invention.
Figure 7:
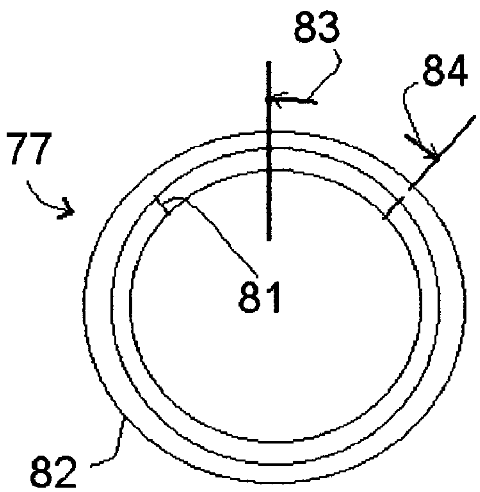
FIG. 7 is a top plan view of the valve lid depicted in FIG. 6.
Figure 8:
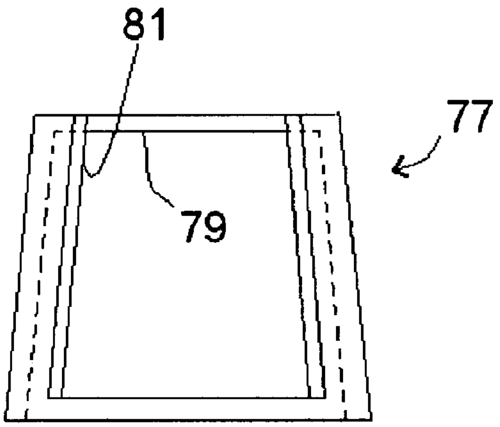
FIG. 8 is a front elevation of the valve lid depicted in FIG. 6.
Figure 9:
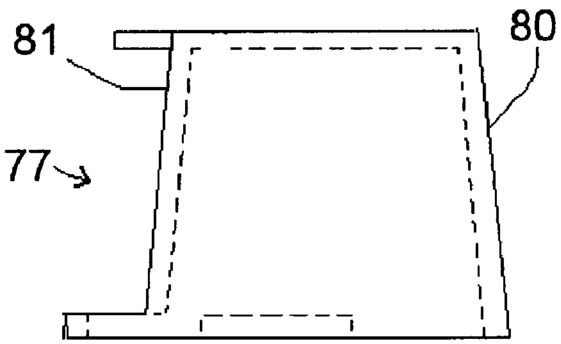
FIG. 9 is a side elevation of the valve lid depicted in FIG. 6.
Figure 10:
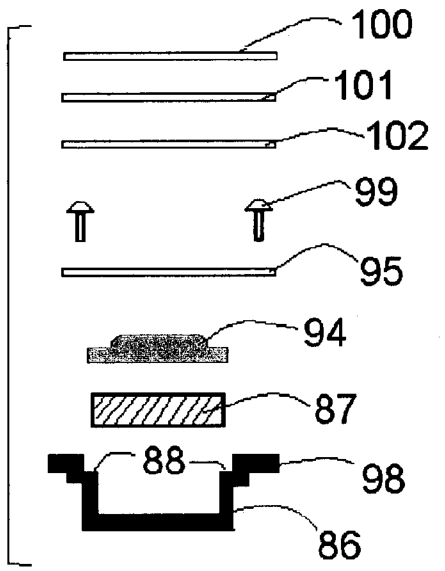
FIG. 10 is an exploded end elevation of a valve assembly constructed according to the principles of the present invention.
Figure 11:
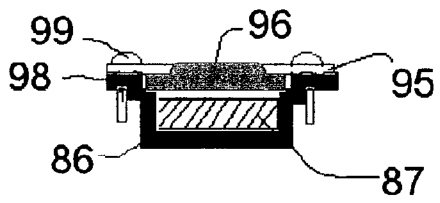
FIG. 11 is an end elevation of the valve assembly depicted in FIG. 10.
Figure 12:
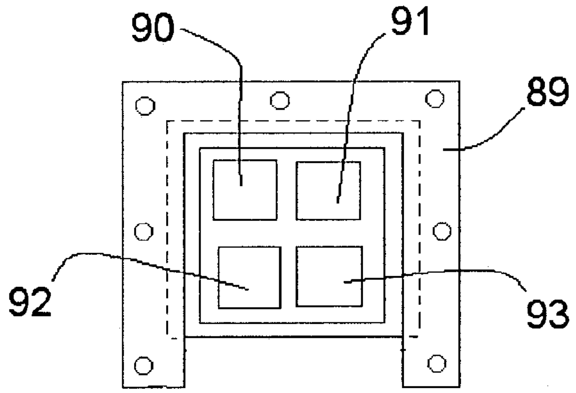
FIG. 12 is a bottom plan view of the valve assembly body depicted in FIG. 10.
Figure 13:
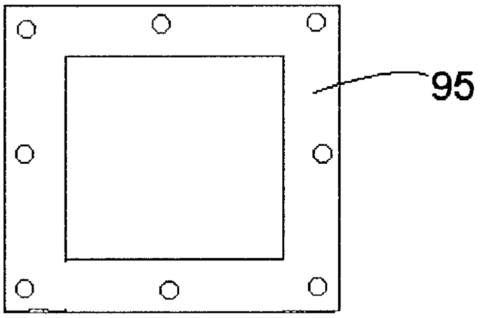
FIG. 13 is a top plan view of the valve assembly cover plate depicted in FIG. 10.
Figure 14:
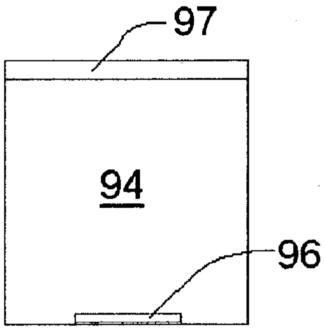
FIG. 14 is a top plan view of the valve assembly slider door depicted in FIG. 10.
Figure 15:
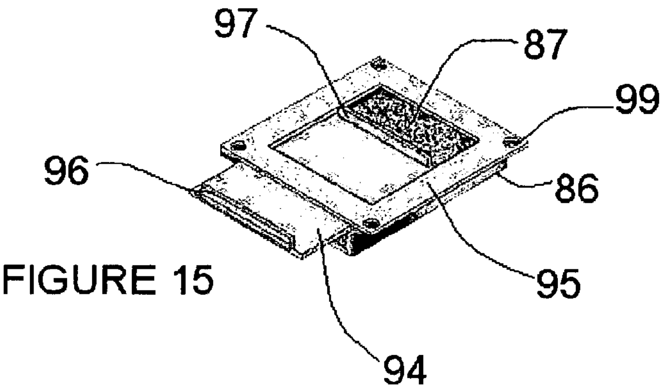
FIG. 15 is a perspective view of the valve assembly depicted in FIG. 10, shown partially opened.

Referring to FIG. 1, an air box 57 is depicted that serves to filter and regulate the quantity of air reaching the carburetor air inlet of an internal combustion engine. The numeral 60 designates the inlet end portion of the combustion air duct which introduces air to a carburetor via air hose 61. The air box 57 is formed to include a top half 58 and a bottom half 59. Air enters the air box 57 through a plurality of orifices such as orifices 62, 63 and 64.

Referring also to FIGS. 2, 3, 4 and 5, an air intake valve body 66 is depicted. Inserted into the interior 68 of the body 66 is a circular filter element 69. The filter element is constructed of any suitable air permeable material such as foam polyurethane or similar resilient material. The element 69 is retained within the body 66 by trap or screen 67. A flange 70 surrounds the body 66 and provides a platform by which the body 66 is mounted to the air box 57. The bottom 76 of body 66 is inserted into one of the orifices 62, 63 or 64 until the flange 70 abuts the outer surface of the air box lower half 59. Suitable mounting holes 71 and 72 permit the insertion of threaded fasteners or rivets so that the flange 70 can be rigidly affixed to the air box half 59.

The valve body 66 is formed to also include an air inlet duct 73, which is a truncate cone having a discontinuous sidewall 74. An opening 75 is formed within the sidewall 74 that extends for approximately ninety degrees of the circumference 85 of valve body 66. Alternatively, the sidewall 74 can be formed so as to extend around the entire perimeter of body 66, and instead of opening 75 can be formed to include perforations or slits within the sidewall 74. In any event, the opening 75 exists so that air entering the filter element 69 through the bottom 76 of valve body 66 will be able to enter the interior of air box 57 for subsequent passage to carburetor intake hose 61.

As seen with reference to FIGS. 6, 7, 8 and 9, the size of opening 75 is regulated by means of a rotatable lid 77. The lid 77 is dimensioned so as to fit over the valve body 66. When fully assembled, the top edge 78 of body 66 abuts the underside 79 of lid 77. The tapered sidewall 80 of lid 77 is suitably dimensioned so as to abut the conical sidewall 74 of valve body 66. The lid 77 includes an opening 81 that extends for approximately ninety degrees of the circumference 82 of lid 77. When fully nested over valve body 66, lid 77 is retained within a groove 49 may be rotated in the directions indicated by arrows 83 and 84. Since the size and shape of openings 75 and 81 are approximately the same, the lid 77 may be rotated so that the opening 81 overlies valve body opening 75, thereby permitting the maximum available quantity of air to enter the air box 57. The lid 77 may also be rotated so as to progressively reduce the size of valve body opening 75 as lid sidewall 80 obscures or covers progressively more of the opening 75. This process can continue until valve body opening 75 is completely shut off. Ideally, the lid 77 is mounted so that it is accessible to a user who can reach some exterior portion of air box 57. Since a plurality of valve body 66 and valve lid 77 assemblies are typically mounted on (and through) air box 57, in operation some openings 75 may be completely closed or open while others are only partially open.

An alternate apparatus for regulating the amount of air entering air box 57 is best seen in FIGS. 10, 11, 12, 13, 14 and 15, as well as FIG. 1. In the alternate embodiment, a rectangular opening is used which may be of any size but is typically formed as a square on the order of one to two inches wide. In this alternate embodiment the valve body 86 is formed as an open tray into which is placed a snugly fitting air filter 87. The bottom 89 of tray 86 includes a series of openings 90, 91, 92 and 93 through which atmospheric air is admitted to the air box 57 after passing through the filter 87. The tray includes longitudinal rails 88 which are adapted to receive a slider valve or door 94. The door 94 includes a stop 96 which also serves as a handle when manipulating the door 94. A retaining stop 97 is placed at the opposite end of the door 94. The door 94 is slidably retained against rails 88 by a top cover plate 95. The top cover plate 95 is held in an abutting relationship with the flange 98 of tray 86 by fasteners 99. Optionally, a prefilter 100 can be affixed to the flange 98 with hook and loop fasteners 101 and 102. The effect of the prefilter 100 is to force atmospheric air entering filter 87 to first pass through a fine 10–200 micron mesh screen, further reducing the amount of particulate material entering the air box 57.

Figure 16:
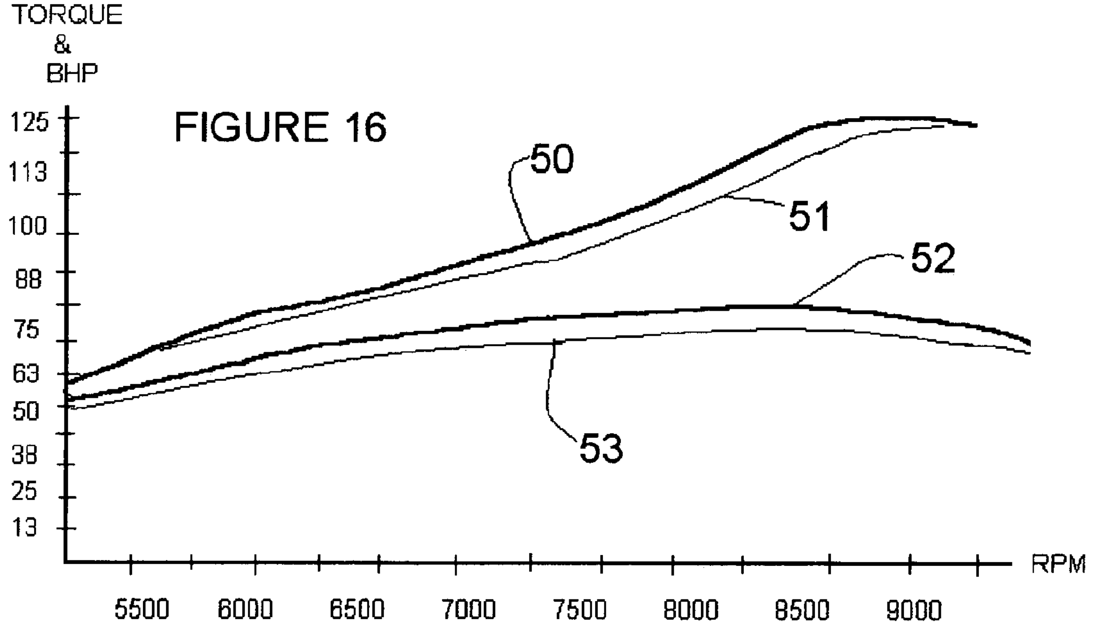
FIG. 16 is a graph depicting selected performance characteristics of a snowmobile when utilizing the present invention.

In operation, any of the adjustable valves is operated manually to adjust the amount of air entering the air box 57. The goal is to supply air to the air box 57 in the correct volume so that engine is taking air from the air box in synchronicity with the demand of the engine for air during each suction pulse. Each valve can be adjusted to admit more or less air by infinitely variable adjustment of the lid 77 or sliding door 94. Any number of valves can be installed as desired to achieve the appropriate performance effect. The valves can be used to balance the effect of differences in carburetor jetting from one cylinder to another. As seen in FIG. 16, the effect on engine torque and horsepower with the valves in differing positions is substantial. Curve 50 depicts the brake horsepower produced by a typical snowmobile having three of the valves 66 mounted on the air box. Each valve is fully open, while curve 51 depicts the horsepower produced by same machine with all three valves 66 closed. Similarly, curve 52 depicts the torque produced by a typical snowmobile having all three valves 66 fully open, while curve 53 depicts the same machine in its stock (all three valves 66 closed) configuration. Table 1 compares the performance of a typical snowmobile engine when the valves of the present invention are employed. In every case, opening of the valves results in a greater torque and horsepower production by the engine.

TABLE 1

| ENGINE RPM | TORQUE VALVES CLOSED | TORQUE VALVES OPEN | HP VALVES CLOSED | HP VALVES OPEN | TORQUE CHANGE | HP CHANGE |
|---|---|---|---|---|---|---|
| 5000 | 50.0 | 50.9 | 47.5 | 48.5 | +0.9 | +1.0 |
| 5100 | 50.7 | 53.0 | 49.2 | 51.5 | +1.3 | +2.3 |
| 5300 | 51.0 | 53.0 | 51.5 | 53.5 | +2.0 | +2.0 |
| 5500 | 51.4 | 52.0 | 53.7 | 54.5 | +0.6 | +0.8 |

TABLE 1-continued

| ENGINE RPM | TORQUE VALVES CLOSED | TORQUE VALVES OPEN | HP VALVES CLOSED | HP VALVES OPEN | TORQUE CHANGE | HP CHANGE |
|---|---|---|---|---|---|---|
| 5700 | 52.7 | 53.2 | 57.2 | 57.9 | +0.5 | +0.7 |
| 5900 | 55.7 | 56.7 | 62.5 | 63.7 | +1.0 | +1.5 |
| 6400 | 65.4 | 68.6 | 79.6 | 83.6 | +1.2 | +4.0 |
| 6700 | 69.9 | 73.0 | 89.0 | 93.1 | +3.1 | +4.1 |
| 6900 | 71.3 | 74.0 | 93.6 | 97.4 | +2.7 | +3.8 |
| 7100 | 72.0 | 74.1 | 97.3 | 100.4 | +2.1 | +3.1 |
| 7300 | 72.0 | 74.0 | 100.1 | 102.9 | +2.0 | +2.8 |
| 7500 | 72.0 | 74.0 | 103.0 | 105.5 | +2.0 | +2.5 |
| 7700 | 72.4 | 74.5 | 106.1 | 109.1 | +2.1 | +3.0 |
| 7900 | 73.0 | 76.3 | 109.9 | 113.3 | +3.3 | +3.4 |
| 8100 | 73.5 | 75.9 | 113.5 | 117.0 | +2.4 | +3.5 |
| 8300 | 73.5 | 75.3 | 116.1 | 119.0 | +2.0 | +2.9 |
| 8500 | 72.0 | 73.0 | 116.6 | 118.3 | +1.0 | +1.7 |
| 8700 | 69.4 | 69.6 | 115.0 | 115.5 | +0.2 | +0.5 |
| 8900 | 67.3 | 68.3 | 114.0 | 115.8 | +1.0 | +1.8 |

The valves may be opened to a desired degree to compensate for a variety of real world situations. In particular, adjustment of the valves may be appropriate when the vehicle encounters a temperature or an altitude change. The performance increases set forth here are not limited to use with carburetion, but may also be realized when the valves are used with a fuel injected engine.

Those skilled in the field of internal combustion engines will appreciate that the present invention can be embodied in other forms. For example, while the valves are illustrated as an after market modification of an existing air box. An original equipment manufacturer may readily incorporate the present invention directly into the air box at the time of manufacture, such as by direct molding. While the illustrated embodiments show the operation of the valves by hand, other methods may be employed. A cable may be used to manipulate the valves from the vehicle operating position while the vehicle is in motion. Further, an automatic operation may be realized by fitting the valves with an appropriate servomechanism interconnected to a RPM, ignition or air pressure sensing and controlling device. While the present embodiments have been shown in the context of admitting air to an air box, the present invention may also be advantageously used to regulate the amount of air exiting the region surrounding an internal combustion engine. The valves may be placed on the hood of a vehicle, for example, to regulate the amount of heated air exiting the engine compartment, thereby promoting efficient operation of the engine within specified temperature limits. Similarly, some optimum temperature and pressure may be desired in the engine compartment, since high vehicle velocities often cause engine compartment pressures to change, thereby causing the engine to run rich or lean depending on the particular compartment geometry. Hence, the valve may need to be adjusted throughout the vehicle speed regime. While the foregoing uses of the invention have been specifically contemplated by the inventor, the scope of the invention is limited only by the appended claims

What is claimed is:

1. A system for regulating air flow to an internal combustion engine having an induction system that includes an air box, comprising:

a valve body, the valve body being affixed to the air box so as to permit atmospheric air to be directed through the valve body into an interior region of the air box, the valve body being formed as a truncated cone, the truncated cone comprising:

a first discontinuous sidewall; and a first longitudinal axis; and a valve lid, the valve lid being movably affixed to the valve body so as to define dimensions of an opening within the valve body through which the atmospheric air passes, the valve lid is formed as a truncated cone comprising:

a second discontinuous sidewall; and a second longitudinal axis, the valve lid being mounted over the valve body such that the first and second longitudinal axes are collinear, the valve lid being rotatable about the second longitudinal axis.

2. The system of claim 1, wherein rotation of the valve lid about the second longitudinal axis causes discontinuities in the first discontinuous sidewall to be progressively obstructed, thereby regulating atmospheric air flow through the valve body.

3. The system of claim 2, wherein the first discontinuous sidewall includes a discontinuity formed as a substantially rectangular sector removed from the sidewall, thereby forming an orifice through the first discontinuous sidewall.

4. The system of claim 3, wherein the second discontinuous sidewall includes a discontinuity formed as a substantially rectangular sector removed from the sidewall, thereby forming an orifice through the second discontinuous sidewall.

5. The system of claim 4, wherein the discontinuities formed within the first and second sidewalls are substantially identical.

6. A system for regulating air flow to an internal combustion engine having an induction system that includes an air box, comprising:

a valve body, the valve body being affixed to the air box so as to permit atmospheric air to be directed through the valve body into an interior region of the air box, the valve body being formed as a longitudinally extending tray, the tray having a discontinuous bottom surface;

a valve lid, the valve lid being movably affixed to the valve body so as to define dimensions of an opening within the valve body through which the atmospheric air passes; and at least one door member, the door member being slidably mounted to the tray so as to regulate air flow through the discontinuous bottom surface.

7. The system of claim 6, further comprising a prefilter, the prefilter being formed as a sheet, the prefilter being affixed to the tray such that the door member resides between the discontinuous bottom surface and the prefilter.

* * * * *